United States Patent
Kato et al.

(10) Patent No.: US 7,735,619 B2
(45) Date of Patent: Jun. 15, 2010

(54) CONTROL APPARATUS FOR VEHICLE AND PARKING MECHANISM

(75) Inventors: Shingo Kato, Toyota (JP); Atsushi Kawamoto, Toyota (JP); Fumimori Imaeda, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 187 days.

(21) Appl. No.: 12/134,387

(22) Filed: Jun. 6, 2008

(65) Prior Publication Data
US 2008/0302627 A1 Dec. 11, 2008

(30) Foreign Application Priority Data
Jun. 6, 2007 (JP) .............................. 2007-150648

(51) Int. Cl.
*B60T 1/06* (2006.01)
*F16H 61/22* (2006.01)

(52) U.S. Cl. ...................... 192/219.5; 74/411.5; 188/31

(58) Field of Classification Search ................ 192/219.5
See application file for complete search history.

(56) References Cited

U.S. PATENT DOCUMENTS

| 4,614,256 A | * | 9/1986 | Kuwayama et al. ...... 192/219.5 |
| 2006/0207373 A1 | * | 9/2006 | Amamiya et al. ........ 74/473.36 |

FOREIGN PATENT DOCUMENTS

| JP | 5-280637 A | 10/1993 |
| JP | 6-193729 A | 7/1994 |
| JP | 2001-153225 | 6/2001 |
| JP | 2005-67479 A | 3/2005 |
| JP | 2005-231382 A | 9/2005 |
| JP | 2006-044554 A | 2/2006 |
| JP | 2006-256478 A | 9/2006 |

* cited by examiner

*Primary Examiner*—Richard M. Lorence
(74) *Attorney, Agent, or Firm*—Sughrue Mion, PLLC

(57) ABSTRACT

When it is predicted that a request for a parking lock operation is likely to be received, an actuator of a parking mechanism is controlled to perform standby processing for bringing the parking mechanism into a standby state immediately preceding a lock state to wait for the request for the parking lock operation.

1 Claim, 9 Drawing Sheets

CONTROL APPARATUS FOR VEHICLE AND PARKING MECHANISM

INCORPORATION BY REFERENCE

The disclosure of Japanese Patent Application No. 2007-150648 filed on Jun. 6, 2007 including the specification, drawings and abstract is incorporated herein by reference in its entirety.

BACKGROUND OF THE INVENTION

1. Field of the Invention

The invention relates to a control apparatus for use in a vehicle, which has a shift-by-wire type parking mechanism for switching an output shaft of an automatic transmission mounted in, for example, a vehicle such as an automobile, between a lock state where the output shaft cannot rotate and an unlock state where the output shaft can rotate. The invention also relates to a shift-by-wire type parking mechanism for switching the output shaft of the automatic transmission between the lock state where the output shaft cannot rotate and the unlock state where the output shaft can rotate.

2. Description of the Related Art

An automatic transmission is generally designed to allow a driver to slide and operate the slide-type shift lever provided in the driver's seat so as to select, for example, the parking range P, the reverse (reverse travel) range R, the neutral range N, and the drive (forward travel) range D by transmitting the operating force of operating the shift lever directly to the parking mechanism or manual valve through a wire, a rod, or the like.

When the parking range P is selected, the parking mechanism brings an output shaft of the automatic transmission into a lock state where the output shaft cannot rotate. When the reverse range R, the neutral range N or the drive range D is selected, the state of a manual valve, which is one of the components of a shift range switching hydraulic circuit provided in the automatic transmission, is changed to engage or disengage friction engagement elements, such as the clutch and brake of a shifting mechanism portion, whereby the requested range is obtained.

Next, the configuration and operation of the parking mechanism will be described.

The parking mechanism is generally configured by a parking gear, a parking lock pawl, and a parking rod.

The parking gear is fixed externally to the output shaft of the automatic transmission. The parking lock pawl is tiltably supported so as to be displaceable close to or away from the parking gear, and has a pawl capable of being engaged into or disengaged from the teeth of the parking gear. The parking rod is provided with a tapered cone at one end side for tilting the parking lock pawl, and is designed to be displaced forward or backward substantially parallel to the output shaft of the automatic transmission.

This parking rod is driven by a detent lever that drives a manual valve.

The detent lever is tilted by any appropriate actuator. The patterns of driving the detent lever include a pattern called direct operation system in which the detent lever is directly connected to a shift lever through, for example, the wire or rod and so as to move together and driven directly by the operating force of the shift lever, and a pattern which is so-called shift-by-wire system.

In the shift-by-wire system, a sensor, a switch or the like detects a driver's operation of the shift lever, and then the detent lever is driven by any appropriate actuator in response to a shift range signal obtained from the detection (see, for example, Japanese Patent Application Publication No. 5-280637 (JP-A-5-280637), Japanese Patent Application Publication No. 2005-69407 (JP-A-2005-69407)).

Note that in the shift-by-wire system, a joystick, a push button or the like besides the commonly-used shift lever described above is sometimes used as an operating member for outputting a parking request signal or a parking release request signal of the parking mechanism.

When operating the parking mechanism, first the parking rod is displaced backward, for example, by tilting the detent lever, and then the tapered cone pushes up the parking lock pawl so that the pawl of the parking lock pawl is engaged into the teeth of the parking gear, whereby the output shaft of the automatic transmission is brought into the lock state where the output shaft cannot rotate.

When, on the other hand, the parking rod is displaced forward, for example, by tilting the detent lever in a direction opposite to the above direction, the force of the tapered cone pushing up the parking lock pawl is released so that the parking lock pawl is pulled downward by a spring and the pawl is separated from the teeth of the parking gear, whereby the output shaft of the automatic transmission is brought into the unlock state where the output shaft can rotate.

Incidentally, compared to the direct operation system for directly setting the lock state by means of the operating force of the shift lever, in the shift-by-wire type parking mechanism described in the above conventional example, a longer predetermined time lag occurs between reception of a request for bringing the unlocked parking mechanism into the lock state and setting of the lock state. It is therefore desired to reduce this time lag.

This is because there is concern that when, for example, the driver releases the foot brake when his/her vehicle is stopped on a sloping road during a period in which the abovementioned time lag occurs, i.e., in the course from the time when the request is made to the time when the lock state is set, the wheels rotate and the vehicle starts moving depending on the inclination of the road, and consequently the lock state cannot be set easily.

SUMMARY OF THE INVENTION

In a control apparatus for a vehicle, which has a shift-by-wire type parking mechanism for switching an output shaft of an automatic transmission between a lock state where the output shaft cannot rotate and an unlock state where the output shaft can rotate, the invention has an object of reducing the time required for setting the lock state after receiving a request for a parking lock operation.

In a shift-by-wire type parking mechanism for switching the output shaft of the automatic transmission between the lock state where the output shaft cannot rotate and the unlock state where the output shaft can rotate, the invention has an object of reducing the time required for setting the lock state after receiving the request for the parking lock operation.

A first aspect of the invention is a control apparatus for use in a vehicle, which has a shift-by-wire type parking mechanism for switching an output shaft of an automatic transmission between a lock state where the output shaft cannot rotate and an unlock state where the output shaft can rotate, wherein the control apparatus controls an actuator of the parking mechanism to perform standby processing for bringing the parking mechanism from the unlock state into a standby state preceding the lock state to wait for a request for the parking lock operation when it is predicted that a parking lock operation is requested. The standby state may be a state in which the parking mechanism is positioned at a point immediately preceding the lock state.

According to the first aspect, regardless of whether or not the road surface on which the vehicle is stopped is inclined, that is, regardless of whether or not the vehicle is inclined, the control apparatus can bring the parking mechanism into the standby state preceding the lock state when the control apparatus predicts that the parking lock operation is requested. Therefore, when the control apparatus receives the request for the parking lock operation in the course of bringing the parking mechanism into the standby state, the control apparatus can set the lock state immediately, whereby the time required for setting the lock state after the request is made can be reduced.

Accordingly, the lock state can be set within a relatively short time, which contributes to improve responsiveness and reliability.

Moreover, in this configuration, when performing the parking lock operation particularly on the sloping road, the vehicle can be prevented from moving in the course of bringing the parking mechanism into the lock state, so that the lock state can be set easily.

The control apparatus may perform the abovementioned prediction by checking whether or not the vehicle speed is zero or less than a predetermined value close to zero.

In this configuration, a condition for prediction may be specified so that the control apparatus can predict that the parking lock operation is requested when, for example, the vehicle speed is less than a certain speed.

The control apparatus may perform the prediction of the request by, first, checking whether or not the vehicle is inclined and then, when the vehicle is inclined, checking whether or not a stopping condition is established, and may perform the abovementioned standby processing when the condition is established.

According to this configuration, when it is predicted that the parking lock operation is requested while the vehicle is stopped on the sloping road, the first aspect of the invention can cope with such a request. Accordingly, the parking mechanism can be locked immediately even on the sloping road.

Moreover, a second aspect of the invention is a control apparatus for use in a vehicle, which has a shift-by-wire type parking mechanism for switching an output shaft of an automatic transmission between a lock state where the output shaft cannot rotate and an unlock state where the output shaft can rotate, wherein the control apparatus has: a posture detector that detects inclination of a stopped vehicle; a stop determination portion that determines whether or not a stopping condition is satisfied; a prediction portion that predicts that a parking lock operation is requested, when it is determined based on an output from the posture detector that the vehicle is inclined and it is determined based on an output from the stop determination portion that the stopping condition is satisfied; and a managing portion that brings the parking mechanism into the lock state or the unlock state in response to a parking request signal or a parking release request signal that is output from a manually operated operating member, and performing standby processing for bringing the parking mechanism from the unlock sate into a standby state preceding the lock state to wait for the parking request signal to be sent from the operating member when the prediction portion predicts that the parking lock operation is requested. The standby state may be a state in which the parking mechanism is positioned at a point immediately preceding the lock state.

This configuration can realize control during the parking lock operation and the standby processing.

The stop determination may be performed by checking whether or not the vehicle speed is zero or less than a predetermined value close to zero.

In this configuration, a pattern of performing the stop determination is specified so that the control apparatus can predict that the parking lock operation is requested when, for example, the vehicle speed is less than a certain speed.

The parking mechanism may be configured by a parking gear, a parking lock pawl, a parking rod, a detent-lever, an actuator, and the operating member. The actuator is controlled to set the lock state when the parking request signal is received from the operating member and to bring the detent lever into a standby posture immediately preceding the lock state when the standby processing is executed.

Note that the parking gear is fixed externally to the output shaft of the automatic transmission. The parking lock pawl has a pawl that is latched to the parking gear, and is displaced so as to latch the pawl to the parking gear to bring the parking gear into the lock state where the output shaft cannot rotate or to separate the pawl from the parking gear to bring the parking gear into the unlock state where the output shaft can rotate. The parking rod is pushed and pulled so as to bring the parking lock pawl close to or away from the parking gear. The detent lever is tiltably supported so as to push and pull the parking rod. The actuator is for tilting the detent lever by a predetermined angle in an appropriate direction. The operating member is for outputting the parking request signal for setting the lock state in response to a manual operation.

In this configuration, a configuration of the parking mechanism to be controlled is specified so that a configuration for performing the parking lock operation and a standby operation is defined.

Note that an example of the standby state of the parking mechanism that immediately precedes the lock state is a state in which the pawl of the paring lock pawl is brought, in a non-contact manner, to the parking gear as close as possible. Furthermore, a driving force that is generated by the actuator to bring the detent lever into the standby posture is called "pretorque."

In this case, when the request for the parking lock operation is received during the standby state, the parking lock pawl can be brought into engagement with the parking gear immediately by slightly moving the pawl of the parking lock pawl toward the parking gear.

Moreover, the invention may has the following configuration in the shift-by-wire type parking mechanism for switching the output shaft of the automatic transmission between the lock state where the output shaft cannot rotate and the unlock state where the output shaft can rotate.

The parking mechanism according to a third aspect of the invention is configured by the parking gear, the parking lock pawl, the parking rod, the detent lever, the actuator, a latch lever, the operating member, and the control apparatus.

Note that the parking gear is fixed externally to the output shaft of the automatic transmission. The parking lock pawl has a pawl that is latched to the parking gear, and is displaced so as to latch the pawl to the parking gear to bring the parking gear into the lock state where the output shaft cannot rotate or to separate the pawl from the parking gear to bring the parking gear into the unlock state where the output shaft can rotate. The parking rod is pushed and pulled so as to bring the parking lock pawl close to or away from the parking gear. The detent lever is tiltably supported so as to push and pull the parking rod. The actuator is for tilting the detent lever by a predetermined angle in an appropriate direction. The latch lever is brought into engagement with a first engaging portion provided in the detent lever, to keep the detent lever in a tilted posture for performing the parking lock operation, and is also brought into engagement with a second engaging portion provided in the detent lever, to keep the detent lever in a tilted posture for releasing the parking lock. The operating member is for outputting the parking request signal for setting the lock state in response to a manual operation. The control apparatus drives the actuator in response to the parking request signal output from the operating member to perform processing for bringing the parking mechanism into the lock state, and drives the actuator to perform standby processing for bringing the parking mechanism from the unlock state into the standby state preceding the lock state to wait for the parking request signal to be sent from the operating member when it is predicted that the parking lock operation is requested. The standby state may be a state in which the parking mechanism is positioned at a point immediately preceding the lock state.

According to the third aspect, regardless of whether or not the road surface on which the vehicle is stopped is inclined, that is, regardless of whether or not the vehicle is inclined, the control apparatus can bring the parking mechanism into the standby state preceding the lock state when the control apparatus predicts that the parking lock operation is requested. Therefore, when the control apparatus receives the request for the parking lock operation in the course of bringing the parking mechanism into the standby state, the control apparatus can set the lock state immediately, whereby the time required for setting the lock state after the request is made can be reduced.

Accordingly, the lock state can be set within a relatively short time, which contributes to improve responsiveness and reliability.

Moreover, in this configuration, when performing the parking lock operation particularly on the sloping road, the vehicle can be prevented from moving in the course of bringing the parking mechanism into the lock state, so that the lock state can be set easily.

In the third aspect, the detent lever of the parking mechanism may be provided with a third engaging portion for keeping the detent lever in the standby posture in which the latch lever is engaged with the detent lever in order to keep the standby posture immediately preceding the lock state.

In this configuration, because the detent lever is mechanically kept in the standby posture by means of the latch lever, the driving force (pretorque) generated by the actuator can be reduced during the standby period, which is advantageous in terms of alleviating the load on the actuator.

The first to third engaging portions of the detent lever of the parking mechanism may be recess portions.

According to this configuration, a production process of forming the recess-shaped first to third engaging portions can be performed relatively easily.

According to the control apparatus for a vehicle and the parking mechanism of the invention, the lock state can be set within a relatively short time after receiving the request for the parking lock operation, thereby improving responsiveness and reliability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Hereinafter, an embodiment of the invention will be described in detail with reference to the drawings.

FIGS. 1 to 9 show an embodiment of the invention. An outline of a power train of a vehicle to which the invention is applied is described with reference to FIG. 1 before explaining the characteristics of the invention.

Figure 1:
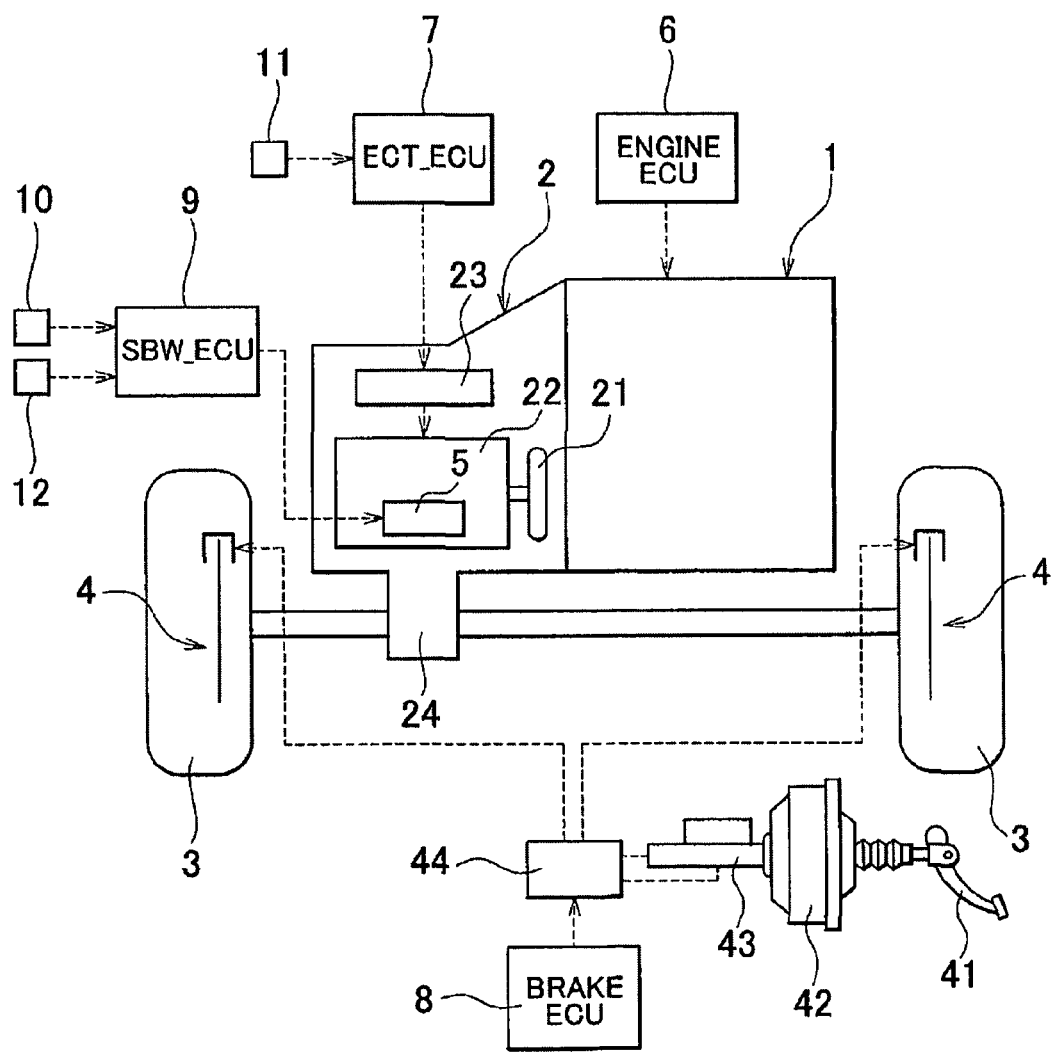
FIG. 1 is a schematic configuration diagram of an embodiment of a control apparatus for a vehicle according to the invention, the diagram showing a power train of the vehicle to which the invention is applied.

FIG. 1 shows a power train of front-engine front-drive (FF) type. The power train as shown in FIG. 1 has an engine 1 as a drive source, an automatic transmission 2, a drive wheel 3, a foot brake 4, a parking mechanism 5, an engine ECU 6 (Electronic Control Unit), an ECT (Electronic Controlled Automatic Transmission)_ECU 7, an ECB (Electronically Controlled Brake System)_ECU 8, and an SBW (Shift-by-Wire)_ECU 9.

This basic configuration is the same as a commonly known configuration, and thus the portions that are not directly related to the invention will be described briefly.

The engine 1 is a gasoline-powered engine, a diesel engine or the like, and a driving operation thereof is controlled by the engine ECU 6.

The automatic transmission 2 is mainly configured by a torque converter 21, a transmission mechanism portion 22, a hydraulic circuit 23 and the like, and a transmission operation of the automatic transmission 2 is controlled by the ECT_ECU 7.

Although not shown, the transmission mechanism portion 22 of the automatic transmission 2 is configured mainly by a plurality of planetary gears, friction engagement elements such as a clutch and a brake, and one-way clutches, and is designed to set a required gear stage by engaging and/or releasing the friction engagement elements in accordance with an operation table predefined in the ECT_ECU 7.

Although not shown, the hydraulic circuit 23 has at least a manual valve, and is designed to secure a hydraulic path for an appropriate friction engagement element in response to, for example, a reverse (reverse travel) range R, a neutral range N, or a drive (forward travel) range D.

The drive wheel 3 is driven to rotate by transmission of a forward driving force or a reverse driving force via a differential 24 and an axle (reference numeral not shown) that are disposed within the automatic transmission 2.

The brake 4 is in the form of, for example, a hydraulic disc brake and provides a frictional force to a disc rotor (reference numeral not shown) to apply a braking force to the drive wheel 3 when a driver performs pedaling operation on a brake pedal 41 installed within the vehicle. This brake 4 may be in the form of a drum brake. Generally, the pedaling force (stepping force) is amplified by a booster 42 and a master cylinder 43, and a strong braking force is obtained with a light stepping force.

This brake 4 is provided with a brake hydraulic control unit 44 in the middle of a hydraulic path extending from the master cylinder 43 to a brake caliper (reference numeral not shown), in order to realize commonly known brake assist function and anti-lock brake function, and is designed to appropriately control the brake hydraulic control unit 44 by means of the brake ECU 8.

Figure 2:
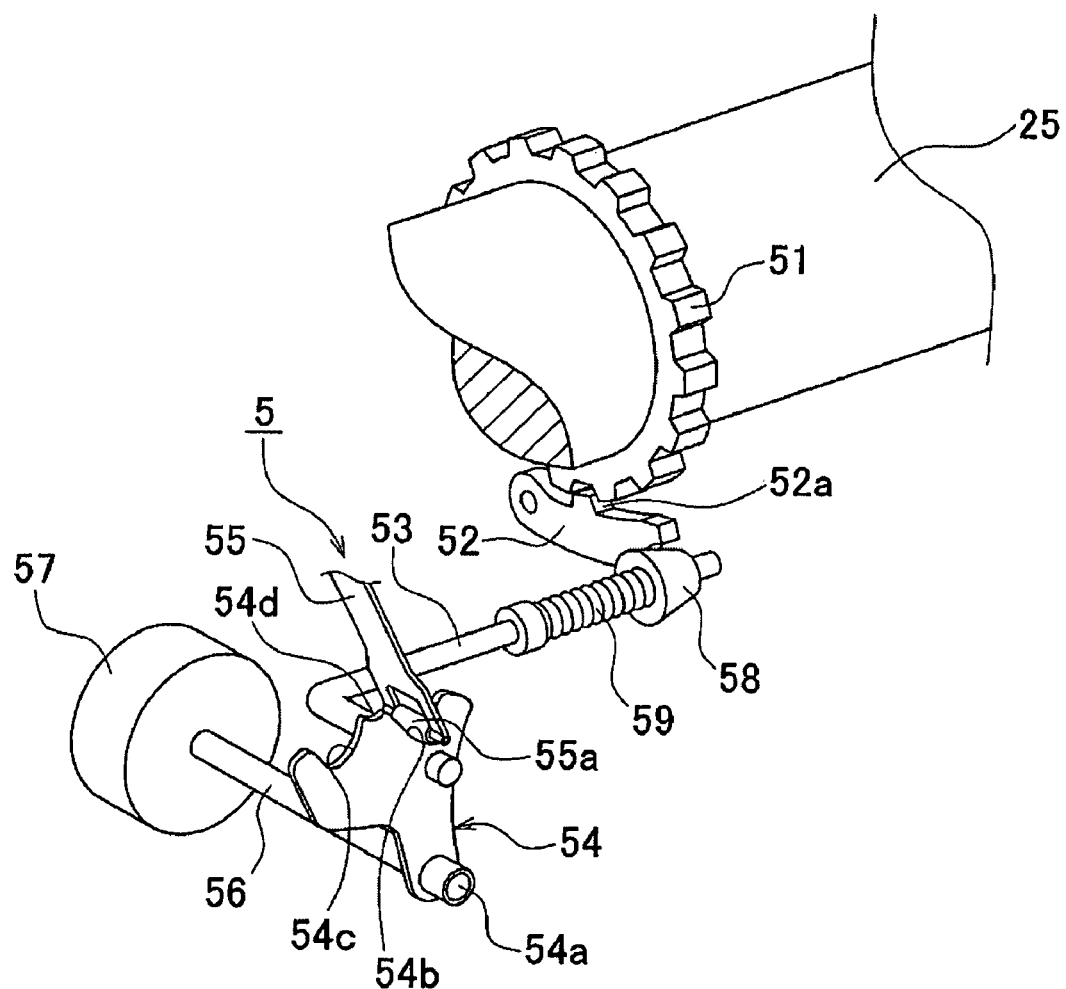
FIG. 2 is a perspective view showing a schematic configuration of a parking mechanism of FIG. 1 in an unlock state.
Figure 3:
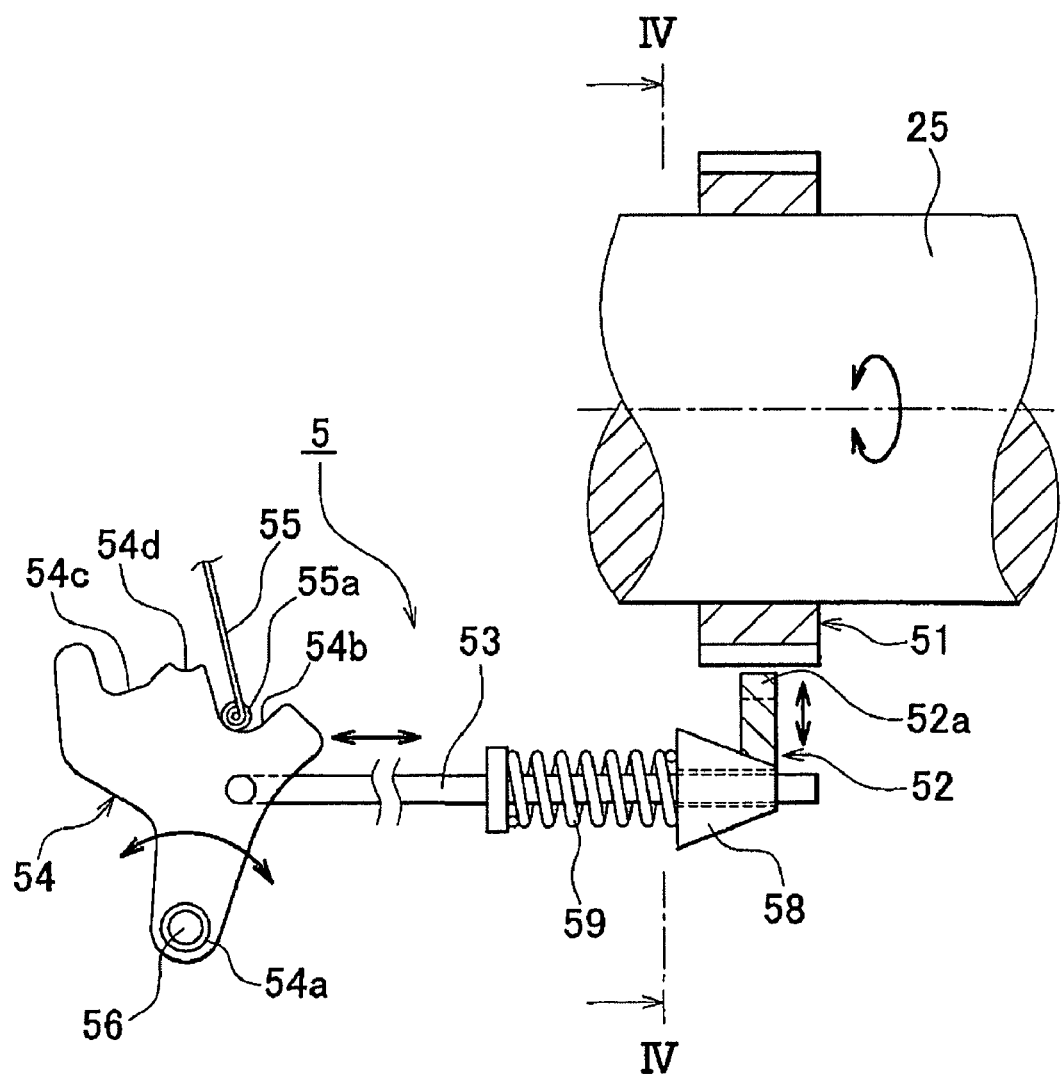
FIG. 3 is a side view of the parking mechanism of FIG. 2.
Figure 4:
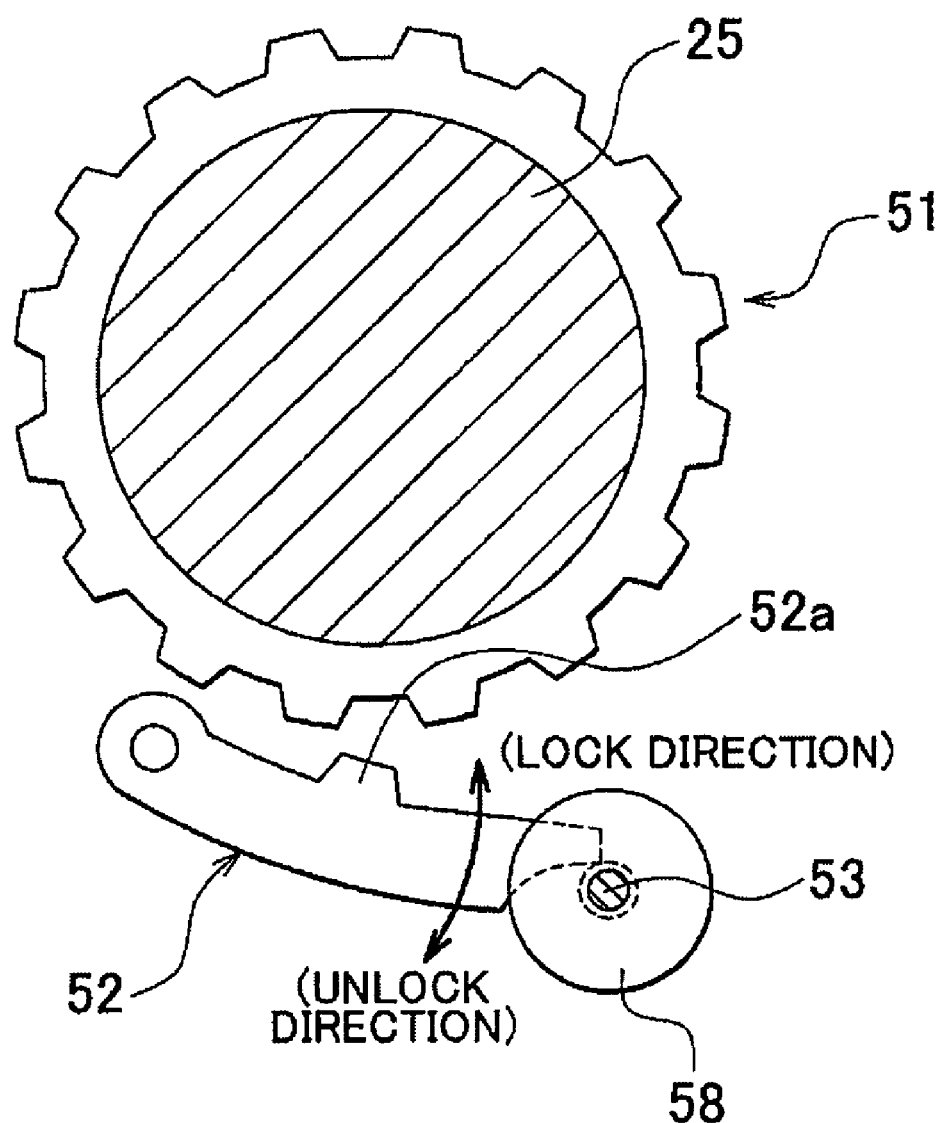
FIG. 4 is a view on arrow showing a cross section taken along the line IV-IV of FIG. 3.

The parking mechanism 5 is configured as shown in FIGS. 2 to 4 and configured in the form of a so-called shift-by-wire type parking mechanism, which, according to need, brings an output shaft 25 of the automatic transmission 2 into a lock state where the output shaft 25 cannot rotate or an unlock state where the output shaft 25 cannot rotate.

Note that the output shaft 25 of the automatic transmission 2 is in the form of, for example, a counter drive gear, but can be in the form of another power transmission shaft.

Specifically, the parking mechanism 5 is mainly configured by a parking switch 10, a parking gear 51, a parking lock pawl 52, a parking rod 53, a detent lever 54, a latch lever 55, a control shaft 56, and an actuator 57.

The parking gear 51 is fixed externally to the output shaft 25 of the automatic transmission 2 so as to be able to rotate integrally therewith.

The parking lock pawl 52 is disposed in the vicinity of the parking gear 51 so as to be tiltable with one end of the parking lock pawl 52 as a fulcrum. A pawl 52a capable of being engaged into or disengaged from the teeth of the parking gear 51 is provided in the middle of a longitudinal direction of the parking lock pawl 52.

The parking rod 53 is disposed so as to be displaced toward a front end or a rear end of the parking rod 53 in substantially parallel to the output shaft 25 by a tilting operation of the detent lever 54.

The front end of the parking rod 53 is coupled to the detent lever 54, and the rear end of the parking rod 53 is provided with a tapered cone 58 for tilting the parking lock pawl 52, as shown in FIG. 2.

Note that the tapered cone 58 is pressed toward the parking gear 51 side by a coil spring 59. The coil spring 59 is attached externally on the parking rod 53, and one end of the coil spring 59 is supported by a snap ring (reference numeral not shown) that is latched and fixed to the parking rod 53.

The detent lever 54 is configured such that a cylindrical boss portion 54a integrally formed on the detent lever 54 at the part causing the tilting is, for example, externally spline-fitted to a control shaft 56 so as to be able to rotate integrally with the control shaft 56. An upper end side of the detent lever 54 is provided with two engagement recess portions 54b, 54c.

The parking rod 53 is coupled to the detent lever 54. In this coupling pattern, for example, a curved end of the parking rod 53 is inserted into a through-hole provided in a predetermined position of the detent lever 54, and then the detent lever 54 is retained fixed to this curved end by means of a snap ring or a latch pin, which is not shown.

The latch lever 55 is for keeping the tilted posture of the detent lever 54, and configured such that a roller 55a, which is engaged with engagement recess portions 54b, 54c provided on the detent lever 54, is provided on one end of a main body that is composed of a leaf spring or the like the other end of which is fixed to an automatic transmission case (reference numeral not shown). The roller 55a of the latch lever 55 is engaged with the first engagement recess portion 54b when the parking mechanism is unlocked, i.e., when releasing the parking lock, and engaged with the second engagement recess portion 54c when the parking lock operation is performed.

The control shaft 56 is supported rotatably by the automatic transmission case or the like, which is not shown, and reciprocally driven to rotate by a predetermined angle by the actuator 57.

Although not shown, the actuator 57 is configured by an appropriate motor and a deceleration mechanism (e.g., a worm gear, a planetary gear, or the like). This actuator 57 is electrically controlled by the SBW_ECU 9 in response to a manual operation performed on, for example, the parking switch 10 serving as the operating member.

The parking switch 10 is in the form of a toggle-type switch for alternately outputting a parking request signal and a parking release request signal every time, for example, a pressing operation is performed.

Each of the ECUs 6, 7, 8 and 9 described above is configured by a CPU, a ROM, a RAM, a backup RAM and the like as is commonly known, and is capable of bi-directionally transmitting and receiving information required by all of these components. The ROM has stored therein various control programs and maps that are referred to when executing these various programs. The CPU executes various arithmetic processing based on the various control programs and maps stored in the ROM. The RAM is a memory for temporarily storing results of computation of the CPU and data that are input from each sensor, and the backup RAM is a nonvolatile memory for storing the data to be saved when, for example, stopping the engine 1.

The basic operations performed by such a parking mechanism 5 will now be described.

First, when the driver presses the parking switch 10 when the parking mechanism 5 is in the unlock state as shown in FIGS. 3 and 4, the parking request signal is output from the parking switch 10 and input to the SBW_ECU 9.

The SBW_ECU 9 then controls the actuator 57 to rotate the control shaft 56 by a predetermined angle in a locking direction, e.g., a direction of positive rotation.

Accordingly, the control shaft 56 and the detent lever 54 are integrally tilted in the locking direction, whereby the parking rod 53 is pressed toward its rear end side. Then, a larger diameter side of the tapered cone 58 pushes up the parking lock pawl 52, whereby the pawl 52a is engaged into the teeth of the parking gear 51 (see FIGS. 6 and 8). Consequently, the parking mechanism 5 is brought into the lock state where the output shaft 25 cannot rotate. At this moment, because the roller 55a is engaged with the second engagement recess portion 54c of the detent lever 54, the posture of the detent lever 54 is defined and kept.

Figure 6:
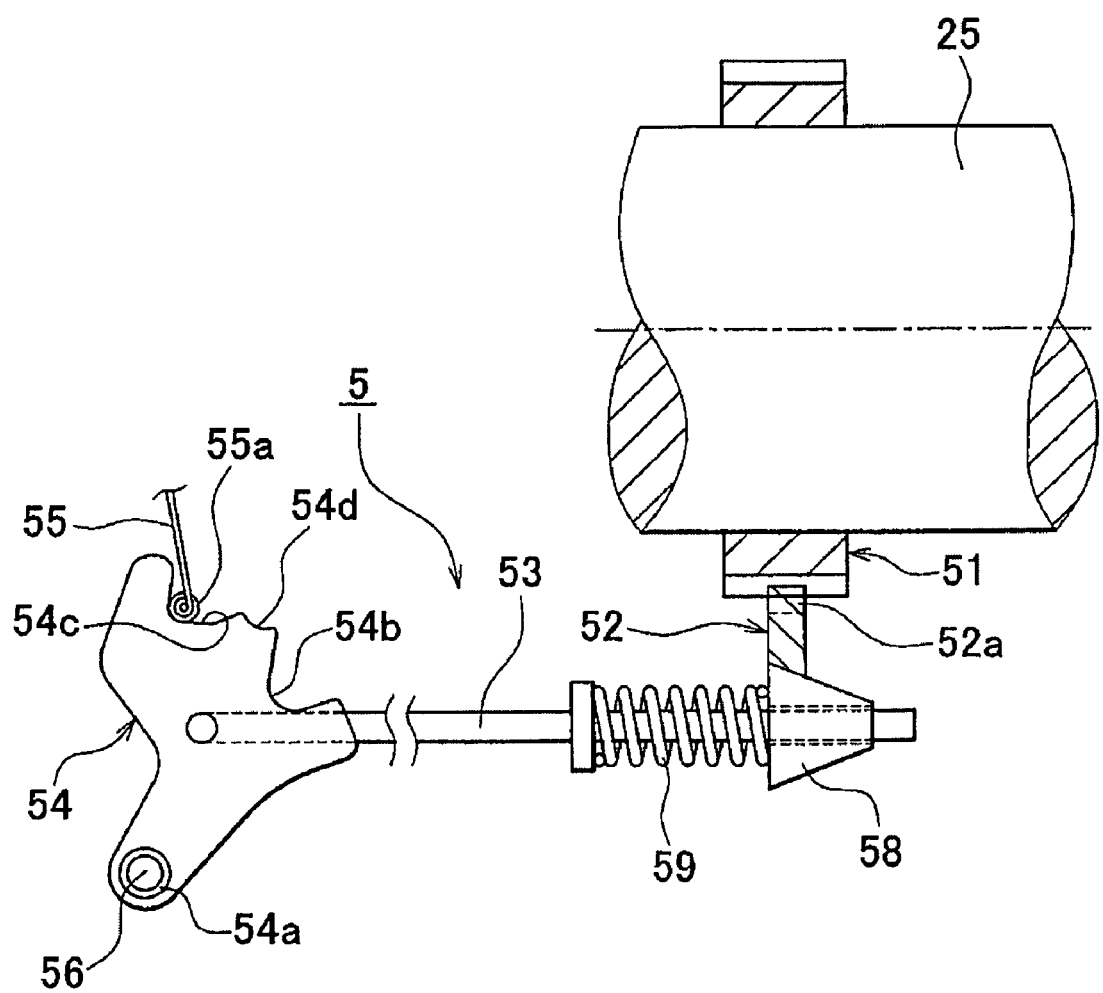
FIG. 6 is a view showing a lock state of the parking mechanism of FIG. 3.
Figure 8:
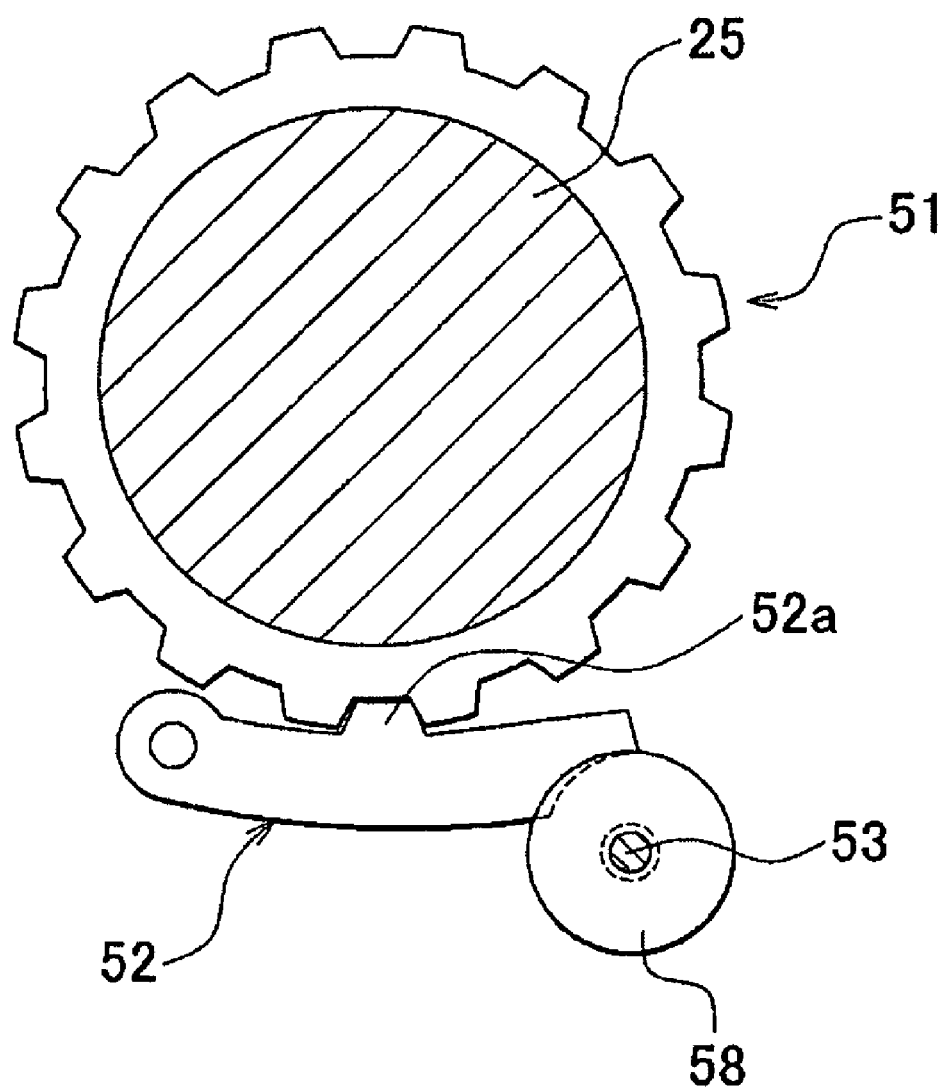
FIG. 8 is a view showing the lock state of the parking mechanism of FIG. 4.

On the other hand, when the driver presses the parking switch 10 when the parking mechanism 5 is in the lock state as shown in FIGS. 6 and 8, the parking release request signal is output from the parking switch 10 and input to the SBW_ECU 9.

The SBW_ECU 9 then controls the actuator 57 to rotate the control shaft 56 by a predetermined angle in an unlocking direction, e.g., a direction of negative rotation.

Accordingly, the control shaft 56 and the detent lever 54 are integrally tilted in the unlocking direction. Consequently, the parking rod 53 and the tapered cone 58 are pulled toward the front end side, and the force of the tapered cone 58 pushing up the parking lock pawl 52 is released, whereby the parking lock pawl 52 descends and the pawl 52a separates from the teeth of the parking gear 51 (see FIGS. 3 and 4). Note that the parking lock pawl 52 is always urged by a spring, not shown, in a direction of separating the parking lock pawl 52 from the parking gear 51. As a result, the parking mechanism 5 is brought into the unlock state where the output shaft 25 can rotate. At this moment, because the roller 55a of the latch lever 55 is engaged with the first engagement recess portion 54b of the detent lever 54, the posture of the detent lever 54 is defined and kept.

Here, the portions to which the characteristics of the invention are applied will be described in detail.

This embodiment is basically contrived such that when it is predicted that the parking lock operation is requested, the actuator 57 of the parking mechanism 5 is controlled to perform the standby processing for bringing the parking mechanism 5 into a standby state immediately preceding the lock state to wait for the request for the parking lock operation.

Figure 7:
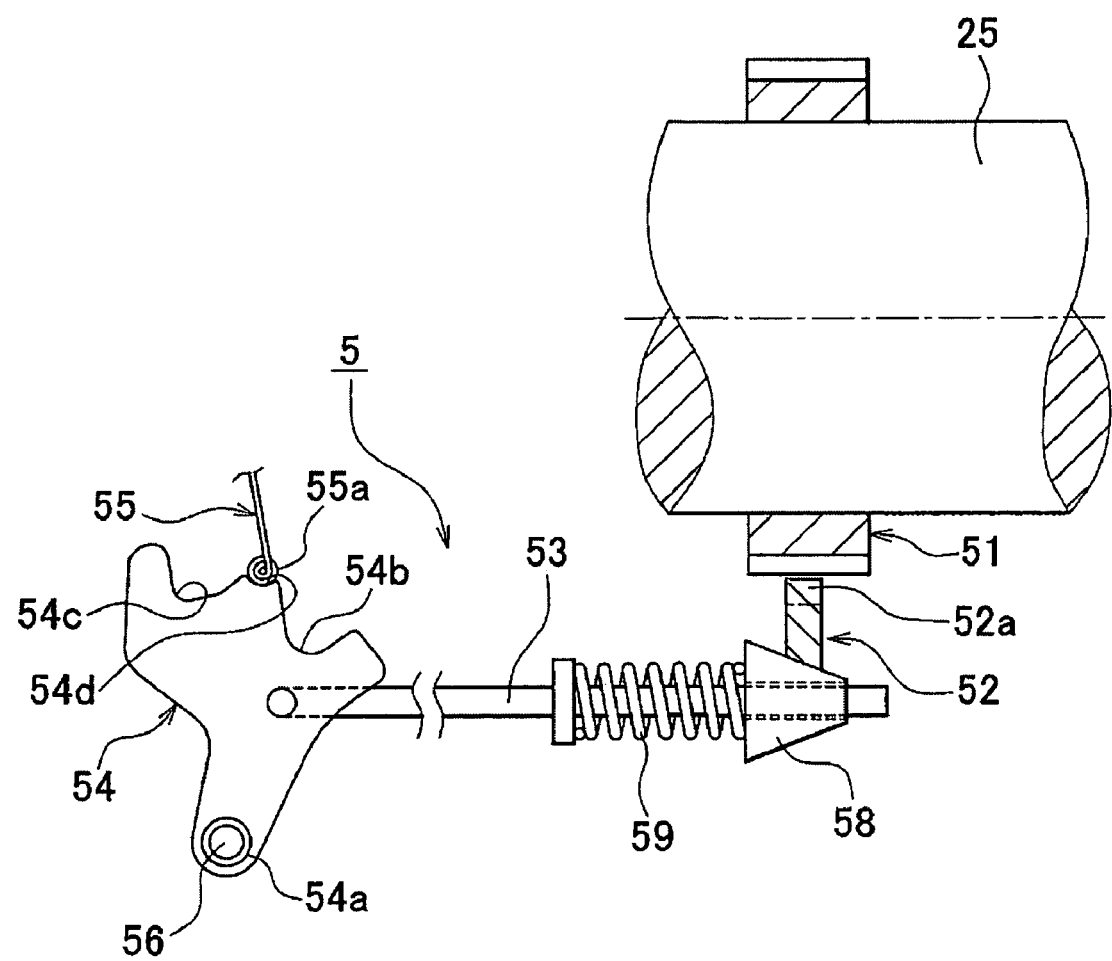
FIG. 7 is a view showing a standby state of the parking mechanism of FIG. 3, the standby state immediately preceding the lock state.

Specifically, in the standby processing, the detent lever 54 is brought into a standby posture immediately preceding the lock state by the actuator 57 (see FIG. 7). A driving force that is generated by the actuator 57 to bring the detent lever 54 into the standby posture is called "pretorque."

Figure 9:
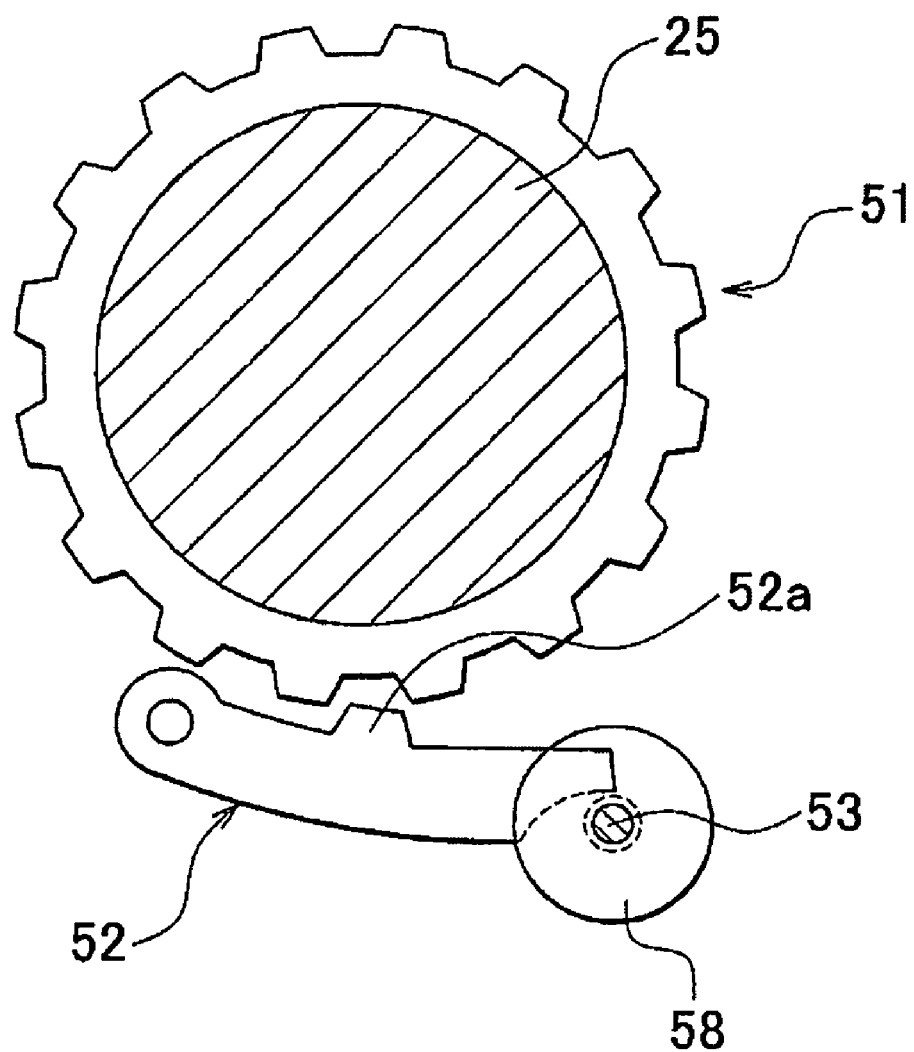
FIG. 9 is a view showing the standby state of the parking mechanism of FIG. 4, the standby state immediately preceding the lock state.

In this manner, when the dente lever 54 is brought into the standby posture immediately preceding the lock state, the pawl 52a of the parking lock pawl 52 is brought, in a non-contact manner, to the parking gear 51 as close as possible (see FIG. 9).

In this embodiment, a third engagement recess portion 54d is provided at a mountain-shaped portion between the two engagement recess portions 54b, 54c of the detent lever 54.

The third engagement recess portion 54d is so shaped that the roller 55a of the latch lever 55 can be engaged therewith, and is designed so as to be able to keep the detent lever 54 in the standby posture by bringing the roller 55a of the latch lever 55 into engagement with the third engagement recess portion 54d when the detent lever 54 is brought into the standby posture immediately preceding the lock state, as described above.

Figure 5:
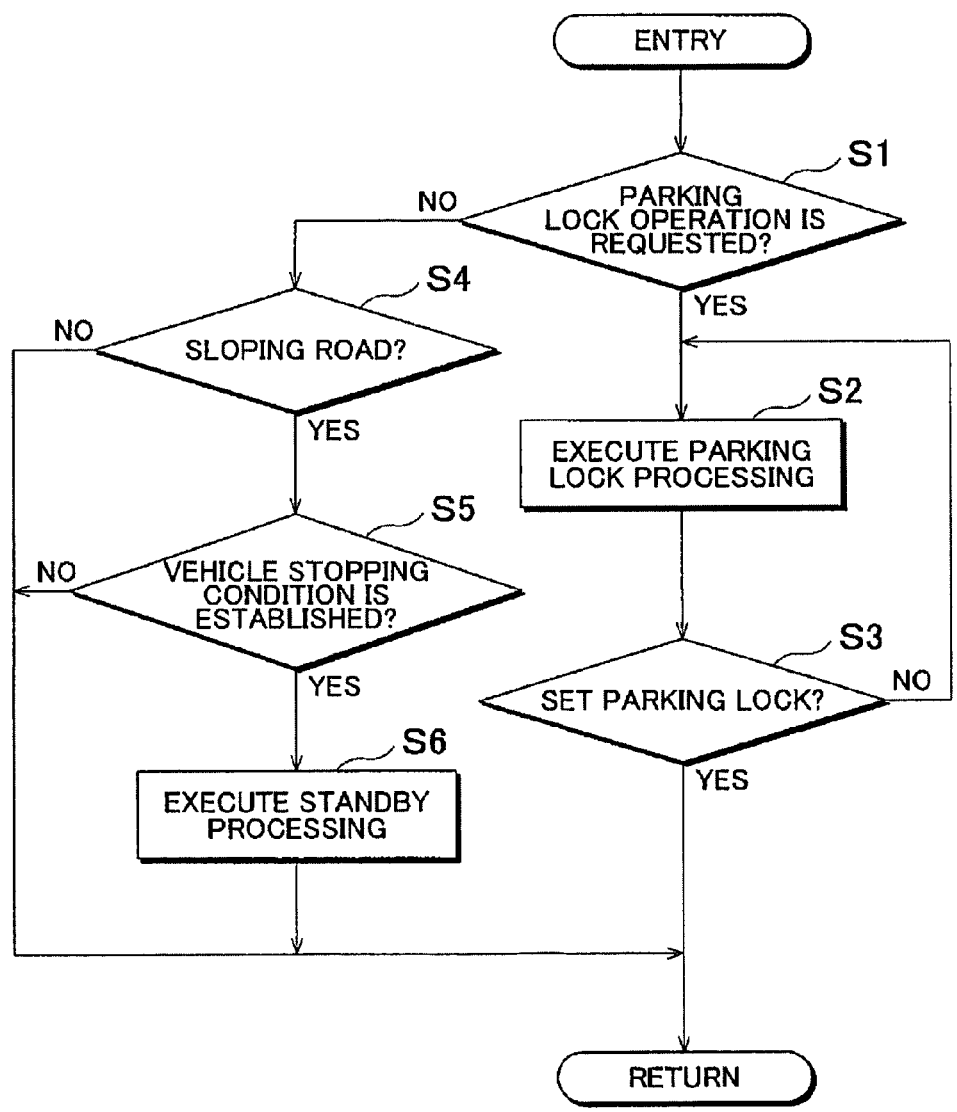
FIG. 5 is a flowchart for explaining operations of the control apparatus for a vehicle of the embodiment.

Next, the operations of this embodiment will be described with reference to the flowchart shown in FIG. 5. The flowchart shown in FIG. 5 is the processing performed by the SBW_ECU 9, which is entered into every certain period.

First, in step S1, it is determined whether or not the request for the parking lock operation is received. This determination can be made by, for example, checking whether or not the parking request signal that is output from the parking switch 10 has been input by the driver operating the parking switch 10.

Here, when the parking request signal that is output from the parking switch 10 is input, the determination is made in the affirmative in step S1, and parking lock processing is executed in the subsequent steps S2 and S3, but when the parking request signal is not input, the determination is made in the negative in step S1 and the routine shifts to the flow from step S4 to S6.

Note that in step S2, the parking lock processing is executed so as to bring the parking mechanism 5 into the lock state. In this parking lock processing, the actuator 57 of the parking mechanism 5 is driven to bring the pawl 52a of the parking lock pawl 52 into engagement with the teeth of the parking gear 51.

This step S2 is performed until it is determined in the subsequent step S3 that the parking lock is set. This determination can be made by, for example, checking whether or not the detent lever 54 is in the posture obtained when the parking range P is set, on the basis of detection signals from the sensors and the like, not shown.

Here, when the parking lock processing is not completed, the determination is made in the negative in step S3, and step S2 is repeated until the parking lock processing is completed. However, once the parking lock processing is completed, the determination is made in the affirmative in step S3 and this flowchart is exited.

Next, the flow from step S4 to S6 will be described. Specifically, in steps S4 and S5 it is predicted whether or not the situation is such that the request for the parking lock operation is likely to be received, such as on a sloping road.

First, in step S4 it is determined whether or not the road surface on which the vehicle is about to stop or stopped is a sloping road. This determination can be made based on the output from a gradient sensor 12 installed in the vehicle.

Note that the gradient sensor 12 is posture detection means for detecting the posture of the vehicle. When, for example, the vehicle is in a horizontal posture, it means that the road surface is flat. When the vehicle is tilted upward, it means that the road surface is an upward slope. When the vehicle is tilted downward, it means that the road surface is a downward slope.

Here, when the road is not a sloping road, i.e., in the case of a flat road, the determination is made in the negative in step S4 and the flowchart is exited. When the road is a sloping road, however, the determination is made in the affirmative in step S4 and the routine is shifted to step S5.

It is determined in step S5 whether or not stopping conditions of the vehicle are established. Here, examples of the stopping conditions include a condition that the vehicle speed is zero or less than a predetermined speed close to zero (e.g., 0 km/h to 3 km/h).

Detection of vehicle speed, which is one of the stopping conditions, can be performed by reading the latest vehicle speed information saved in the temporary storage area of the ECT_ECU 7 through, for example, bidirectional communication with the ECT_ECU 7. The ECT_ECU 7 calculates the vehicle speed based on the output from, for example, a wheel speed sensor 11 and saves the result of calculation in the temporary storage area as the latest vehicle speed.

Here, when the stopping condition is not established, the determination is made in the negative in step S5, and the flowchart is exited. When the stopping condition is established, however, the determination is made in the affirmative in step S5 and the routine is shifted to step S6.

In step S6, the standby processing for bringing the parking mechanism 5 into the standby state immediately preceding the lock state is executed. Specifically, in step S6, the actuator 57 of the parking mechanism 5 is driven and thereby the pawl 52a of the parking lock pawl 52 is brought, in a non-contact manner, to the parking gear 51 to the position immediately preceding the engagement between the pawl 52a and the parking gear 51 (see FIGS. 7 and 9).

In this manner, even when the request for the parking lock operation is not received, if the situation where the request for the parking lock operation is likely to be received is predicted in steps S4 through S6, the parking mechanism 5 is brought into the standby state immediately preceding the lock state.

Therefore, when the request for the parking lock operation is received in the standby state, the parking lock processing is executed in the steps S1 through S3, and engagement between the pawl 52a of the parking lock pawl 52 and the parking gear 51 can be made immediately by simply moving the pawl 52a slightly toward the parking gear 51, whereby the lock state can be set within a relatively short time.

Incidentally, as is clear from the description of the operations above, the SBW_ECU 9 may correspond to the control apparatus for a vehicle according to the invention. However, when the engine ECU 6, the ECT_ECU 7, the brake ECU 8 and the SBW_ECU 9 are not provided separately but provided as a single overall control apparatus, such an overall control apparatus may correspond to the control apparatus for a vehicle according to the invention.

As described above, according to the embodiment to which the characteristics of the invention are applied, when it is predicted that the request for the parking lock operation is likely to be received on the sloping road, the parking mechanism 5 is brought into the standby state immediately preceding the lock state. Therefore, when the request for the parking lock operation is received in the standby state, the lock state can be set immediately, and the time required for setting the lock state after receiving the request can be reduced.

Accordingly, even when the parking lock operation is performed on the sloping road, the vehicle can be prevented from moving in the course of bringing the parking mechanism 5 into the lock state, and the lock state can be set easily.

Therefore, the lock state of the parking mechanism 5 can be set within a relatively short time, contributing to improve responsiveness and reliability.

Moreover, when the detent lever 54 is provided with the third engagement recess portion 54*d* and the roller 55*a* of the latch lever 55 is brought into engagement with the third engagement recess portion 54*d* to thereby keep the standby state as described above, the driving force (pretorque) generated by the actuator 57 can be reduced during the standby period. Therefore, for example, a small, low-power and inexpensive actuator can be adopted as the actuator 57 mounted in the parking mechanism 5, which is advantageous in terms of cutting installation cost.

Note that the invention is not limited to the embodiment described above and thus can be modified or applied in various ways within the scope of the patent claims and the equivalent scope thereof. The followings are the examples of such modification and application.

(1) The above embodiment explains an example in which the drive source of the vehicle is the engine 1 only, but a hybrid vehicle that uses an engine and a motor in combination, and a vehicle that uses only a motor are encompassed in the embodiment of the invention.

(2) The above embodiment explains an example of a vehicle of front-engine front-drive (FF) type, but the invention can be applied also to a vehicle of other type such as a front-engine rear-drive (FR) type.

(3) The above embodiment explains an example in which the transmission mechanism portion 22 of the automatic transmission 2 is configured as the planetary gears, but the transmission mechanism portion 22 can be configured as, for example, continuously variable transmission mechanisms of various types. Examples of the continuously variable transmission mechanisms include a belt-type continuously variable transmission (CVT) and a toroidal continuously variable transmission.

(4) The above embodiment explains an example in which the standby processing is performed when it is predicted that the request for the parking lock operation is likely to be received on the sloping road. However, regardless of whether the road surface on which the vehicle is stopped is inclined or not, the standby processing can be performed when it is predicted that the request for the parking lock operation is likely to be received, and such an embodiment also is encompassed in the invention.

(5) The above embodiment explains an example in which the detent lever 54 is provided with the third engagement recess portion 54*d*, but an embodiment in which the detent lever 54 is not provided with the third engagement recess portion 54*d* is also possible and is encompassed in the invention.

In this case, however, it is necessary to generate the driving force (pretorque) for keeping the detent lever 54 in the standby posture by means of the actuator 57, during the period in which the detent lever 54 is in the standby posture.

(6) The above embodiment explains an example in which only the vehicle speed is set as the stopping condition, but the stopping condition can be not only the vehicle speed but also an item for determining whether or not the brake 4 is actuated.

In this case, the determination of whether or not the brake 4 is actuated can be performed by, for example, causing the SBW_ECU 9 to communicate with the brake ECU 8 bi-directionally to check whether a brake actuation flag is "1" or "0." For example, the brake ECU 8 assumes that the brake 4 is actuated when an output value of a pressure sensor (not shown) annexed to the master cylinder 43 is equal to or higher than a predetermined value, and sets the brake actuation flag to "1," while assuming that the brake 4 is not actuated when the output value of the pressure sensor (not shown) of the master cylinder 43 is less than the predetermined value, and setting the brake actuation flag to "0."

What is claimed is:

1. A shift-by-wire type parking mechanism for switching an output shaft of an automatic transmission between a lock state where the output shaft is incapable of rotating and an unlock state where the output shaft is capable of rotating, the parking mechanism comprising:

a parking gear that is fixed externally to the output shaft of the automatic transmission;

a parking lock pawl that has a pawl latched to the parking gear and is displaced so as to latch the pawl to the parking gear to bring the parking gear into a lock state where the output shaft is incapable of rotating or to separate the pawl from the parking gear to bring the parking gear into the unlock state where the output shaft is capable of rotating;

a parking rod that is pushed and pulled so as to bring the parking lock pawl close to or away from the parking gear;

a detent lever that is tiltably supported so as to push and pull the parking rod and is provided with a first engagement recess portion for unlocking, a second engagement recess portion for locking, and a third engagement recess portion for standby that is shallower than the first and second engagement recess portions;

an actuator that tilts the detent lever by a predetermined angle in an appropriate direction;

a latch lever that brings about a state where the detent lever is kept in a tilted posture for performing a parking lock operation, by engaging with the second engagement recess portion, a state where the detent lever is kept in a tilted posture for releasing a parking lock, by engaging with the first engagement recess portion, and a state where the detent lever is kept in a standby posture immediately preceding the lock state, by engaging with the third engagement recess portion;

an operating member that outputs a parking request signal for setting the lock state in response to a manual operation; and a controller that drives the actuator in response to the parking request signal output from the operating member to perform processing for bringing about the state where the detent lever is kept in the tilted posture for performing the parking lock operation, and drives the actuator to perform standby processing for bringing about the state where the detent lever is kept in the standby posture immediately preceding the lock state to wait for the parking request signal to be sent from the operating member when it is predicted that the parking lock operation is requested.

* * * * *